(12) United States Patent
Fu

(10) Patent No.: US 9,690,806 B2
(45) Date of Patent: *Jun. 27, 2017

(54) METHOD AND APPARATUS OF RECOMMENDING CANDIDATE TERMS BASED ON GEOGRAPHICAL LOCATION

(71) Applicant: Alibaba Group Holding Limited, Grand Cayman (KY)

(72) Inventor: Maojian Fu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,042

(22) Filed: Mar. 31, 2016

(65) Prior Publication Data

US 2016/0217154 A1    Jul. 28, 2016

Related U.S. Application Data

(63) Continuation of application No. 13/902,616, filed on May 24, 2013, now Pat. No. 9,332,380.

(30) Foreign Application Priority Data

May 29, 2012 (CN) .......................... 2012 1 0172759

(51) Int. Cl.
| | |
|---|---|
| *G06F 17/28* | (2006.01) |
| *G06F 17/30* | (2006.01) |
| *H04W 4/02* | (2009.01) |
| *G06F 17/27* | (2006.01) |
| *H04M 1/725* | (2006.01) |

(52) U.S. Cl.
CPC ...... *G06F 17/30241* (2013.01); *G06F 17/276* (2013.01); *G06F 17/3087* (2013.01); *G06F 17/30554* (2013.01); *H04M 1/72572* (2013.01); *H04W 4/02* (2013.01); *H04M 2250/10* (2013.01); *H04M 2250/70* (2013.01)

(58) Field of Classification Search
CPC ....... G10L 15/22; G10L 15/00; G10L 15/187; H04M 2203/2061; H04M 2203/255; H04M 2250/58; H04M 3/4936
USPC ..................... 704/7, 240, 251, 256
See application file for complete search history.

(56) References Cited

U.S. PATENT DOCUMENTS

| | | | |
|---|---|---|---|
| 8,677,236 B2* | 3/2014 | Bower | G06F 3/0237 704/240 |
| 2012/0290569 A1* | 11/2012 | Yuhara | G06F 17/30241 707/724 |

* cited by examiner

Primary Examiner — Charlotte M Baker
(74) Attorney, Agent, or Firm — Lee & Hayes, PLLC

(57) ABSTRACT

The disclosure provides a method and device for recommending a candidate word according to a geographic position. The method may include receiving a coded character string of a user by a computing device. The computing device may collect geographic position information corresponding to the coded character string, and then determine a geographic area in which the geographic position information is located. The computing device may obtain a geographic candidate word corresponding to the coded character string according to a geographic word stock of the determined geographic area. The geographic word stock of the geographic area may store the coded character strings and a corresponding geographic word according to the geographic area. As compared to current technologies, complexity of input can be reduced and intelligence of an input method can be improved.

20 Claims, 4 Drawing Sheets

METHOD AND APPARATUS OF RECOMMENDING CANDIDATE TERMS BASED ON GEOGRAPHICAL LOCATION

CROSS REFERENCE TO RELATED PATENT APPLICATIONS

This application is a continuation of U.S. patent application Ser. No. 13/902,616, filed on May 24, 2013, issued as U.S. Pat. No. 9,332,380 on May 3, 2016, which claims priority from Chinese Patent Application No. 201210172759.9, filed on May 29, 2012, entitled "Method and Apparatus of Recommending Candidate Terms Based on Geographical Location," which applications are hereby incorporated in their entirety by reference.

TECHNICAL FIELD

This disclosure relates to the technical field of input methods. More specifically, the disclosure relates to a method and device for recommending a candidate word according to a geographic position.

BACKGROUND

With the development of computer technologies and Internet technologies, computer input methods are deeply involved in people's daily life. As a result, better capabilities of these input methods are highly demanded.

To improve the capabilities, some input methods may support input such as a geographic name and dialect. These input methods construct a geographic language packet (including the geographic name and the dialect). After downloading the geographic language packet to a local file, a user may use the geographic name or the dialect in the geographic language packet. For example, when a user in Hangzhou City of China downloads a Sichuan Province of China language packet and inputs a string in Sichuan dialect, the matched geographic name/dialect word may be displayed to be selected by the user.

Some input methods in the prior art can meet the requirements on quick inputs of geographic names or local dialects. However, with the development of mobile communication technologies and popularization of mobile devices, the influence of a geographic position is great. The influence is especially remarkable when a mobile device is utilized. For example, a user may tell friends about a name of a market when shopping in the market, or may introduce a restaurant through a micro-blog when having a dinner in the restaurant. In some instances, the user may also search service information, such as business areas, restaurants, clubs, hotels, supermarkets, theatres, scenic spots, schools and banks, while traveling.

However, under current technologies, input contents associated with geographic information cannot be intelligently provided for users. Therefore, there is a need to reduce complexity of input methods and to improve the intelligence of the input methods.

SUMMARY

The technical problem to be solved by the disclosure is to provide a method and device for recommending a candidate word according to a geographic position, which can reduce complexity of input methods and improve the intelligence of these input methods.

In some aspects, the disclosure provides a method for recommending a candidate word according to a geographic position. The method may include receiving a coded character string of a user, collecting geographic position information corresponding to the coded character string, determining a geographic area in which the geographic position information is located, obtaining a geographic candidate word corresponding to the coded character string according to a geographic word stock of the determined geographic area, wherein the geographic word stock of the geographic area is used for storing the coded character string and a corresponding geographic word according to the geographic area, and displaying the geographic candidate word.

In some embodiments, the geographic word stock of the geographic area is constructed by counting the utilization frequency of a geographic word in the geographic area and collecting the geographic word of which the utilization frequency meets a corresponding preset utilization frequency condition according to a counting result, and storing the collected geographic word and the corresponding coded character string in the geographic word stock of the geographic area.

In some embodiments, the geographic word of the geographic area is obtained by collecting the geographic word of the geographic area from Internet information according to a geographic position category, and/or recording a triggering condition word displayed on a screen when the user inputs the triggering condition word and displays on the screen, wherein the triggering condition word is a preset geographic word of the geographic area according to the geographic position category.

In some embodiments, the geographic word stock of the geographic area is further used for storing the coded character string, the corresponding geographic position information of the geographic area and the corresponding geographic word. The method may further include retrieving a geographic candidate word corresponding to the coded character string and the geographic position information according to the geographic word stock of the determined geographic area.

In some embodiments, the method may further include obtaining application program environment information corresponding to the coded character string, and obtaining the geographic candidate word corresponding to the coded character string according to the geographic word stock of the determined geographic area when the association degree of the application program environment information and the geographic position meets the preset association degree conditions.

In some embodiments, the method may further include retrieving a corresponding common candidate word in a common word stock according to the coded character string, and displaying the geographic candidate word while displaying the common candidate word.

In some embodiments, the displaying the geographic candidate word may further include sorting the common candidate word and the geographic candidate word according to the sorting factor of a candidate word, wherein the sorting factor may include one or more of the following factors: the matching degree of the candidate word and the geographic position information, the utilization frequency of the candidate word and a retrieval sorting policy. The method may further include displaying the common candidate word and the geographic candidate word according to a sorting result.

In some embodiments, the sorting factor may further include the association degree of the application program environment information and the geographic position.

In some embodiments, the method may further include obtaining the geographic candidate word corresponding to the coded character string from the geographic word stock of the determined geographic area of a client, and/or transmitting the coded character string and the geographic position information to a server terminal which is used for retrieving the geographic candidate word corresponding to the coded character string from the geographic word stock of the determined geographic area.

In some embodiments, the method may further include analyzing the attribute of a geographic position of an unmatched displayed character when the displayed character inputted by the user is not matched with the geographic word stock of the determined geographic area, and synchronizing or adding the unmatched character serving as a geographic word into the geographic word stock of the corresponding geographic area of each client when the analyzed attribute of the geographic position is matched with a preset geographic position attribute condition.

In some aspects, the disclosure further discloses a device for recommending a candidate word according to a geographic position. The device may further include an interface module for receiving a coded character string of a user, a collection module for collecting geographic position information corresponding to the coded character string, a geographic area determination module for determining a geographic area in which the geographic position information is located, a first retrieval module for retrieving a geographic candidate word corresponding to the coded character string according to a geographic word stock of the determined geographic area, wherein the geographic word stock of the geographic area is used for storing the coded character string and the corresponding geographic word according to the geographic area, and a display module displaying the geographic candidate word.

In some embodiments, the device may further include a geographic word stock construction for constructing the geographic word stock of the geographic area, and the geographic word stock construction module may include a counting sub-module for counting utilization frequency of a geographic word in the geographic area, a collection sub-module for collecting the geographic word of which the utilization frequency meets a corresponding preset utilization frequency condition according to a counting result, a storage sub-module for storing the collected geographic word and the corresponding coded character string in the geographic word stock of the geographic area.

In some embodiments, the device may further include a first obtaining module for obtaining the geographic word in the geographic area, wherein the first obtaining module may include an Internet collection sub-module for collecting the geographic word of the geographic area from Internet information according to a geographic position category, and/or a triggering and obtaining sub-module for recording a triggering condition word displayed on a screen when the user inputs the triggering condition word and displays on the screen, wherein the triggering condition word is a preset geographic word of the geographic area according to the geographic position category.

In some embodiments, the geographic word stock of the geographic area further stores the coded character string, the corresponding geographic position information of the geographic area and the corresponding geographic word. The device may further include a second retrieval module for retrieving a geographic candidate word corresponding to the coded character string and the geographic position information according to the geographic word stock of the determined geographic area.

In some embodiments, the device may further include an application program environment obtaining module for obtaining application program environment information corresponding to the coded character string, and the first retrieval module for obtaining the geographic candidate word corresponding to the coded character string and the geographic position information according to the geographic word stock of the determined geographic area when the association degree of the application program environment information and the geographic position meets the preset association degree conditions.

In some embodiments, the device may further include a third retrieval module for retrieving a corresponding common candidate word in a common word stock according to the coded character string, and the display module displaying the geographic candidate word while displaying the common candidate word.

In some embodiments, the display module may further include a sorting sub-module for sorting the common candidate word and the geographic candidate word according to the sorting factor of a candidate word, wherein the sorting factor may include one or more of the following factors: a matching degree of the candidate word and the geographic position information, a utilization frequency of the candidate word and a retrieval sorting policy, and a sorting display sub-module displaying the common candidate word and the geographic candidate word according to a sorting result.

In some embodiments, the sorting factor may further include the association degree of the application program environment information and the geographic position.

In some embodiments, the first retrieval module may further include a client retrieval sub-module for retrieving the geographic candidate word corresponding to the coded character string and the geographic position information from the geographic word stock of the determined geographic area of a client, and/or a server terminal retrieval sub-module for transmitting the coded character string and the geographic position information to a server terminal which is used for retrieving the geographic candidate word corresponding to the coded character string and the geographic position information from the geographic word stock of the determined geographic area.

In some embodiments, the device may further include an analysis module for analyzing the attribute of a geographic position of an unmatched displayed character when the displayed character inputted by the user is not matched with the geographic word stock of the determined geographic area, and a synchronization module for synchronizing the unmatched character serving as a geographic word into the geographic word stock of the corresponding geographic area of each client when the analyzed attribute of the geographic position is matched with a preset geographic position attribute condition.

Compared with the prior art, the disclosure has advantages. In the disclosure, the geographic candidate word matching with the coded character string and the geographic position information is recommended to the user according to comprehensive influence on the candidate word from the inputted coded character string and the geographic position information corresponding to the coded character string. Furthermore, the geographic candidate word is obtained by retrieving in the geographic word stock of the geographic area in which the geographic position information is located, and the geographic word stock of the geographic area is used for storing the coded character string and the corresponding geographic word. Therefore, the geographic candidate word of the geographic area in which the user is located can be recommended according to the geographic position information, that is the candidate word required by the user can be displayed in an inputting process; and therefore, the intelligence of input methods can be improved and complexity of inputting of the user can be reduced.

Furthermore, in the disclosure, when an association degree of the application program environment information and the geographic position matches with the preset association degree conditions, an input requirement of the user on the geographic candidate word is confirmed, and a function of the input method for recommending the user with the geographic candidate word of the geographic area in which the user is located can be activated. The disclosure is additionally provided with a function of judging input requirements of the user, and can recommend the geographic candidate word of the geographic area in which the user is located according to the geographic position information. Accordingly, embodiments of this disclosure can display the candidate word required by the user in a inputting process, so as to be capable of improving the intelligence of input methods.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

The disclosure is described below with reference to the accompanying drawings and embodiments in detail in order to make the purpose, characteristics, and advantages of this disclosure more clear.

Under current technologies, input contents associated with geographic position information cannot be intelligently provided for users. For example, a user downloads a Hangzhou City of China dialect packet and then inputs 'zsj' to seek a candidate word of 'Zhangshengji' (i.e., a restaurant name) when shopping in a mall in No. 701 Fuchun Road Jianggan District of Hangzhou. However, a geographic name of 'Zhusanjiao' (i.e., Pearl River Delta) would be displayed under current technologies, providing no benefit to the user. As a result, the user has to precisely typing the whole spelling of Zhangshengji to obtain the candidate word of 'Zhangshengji', therefore increasing complexity of inputting.

Figure 1:
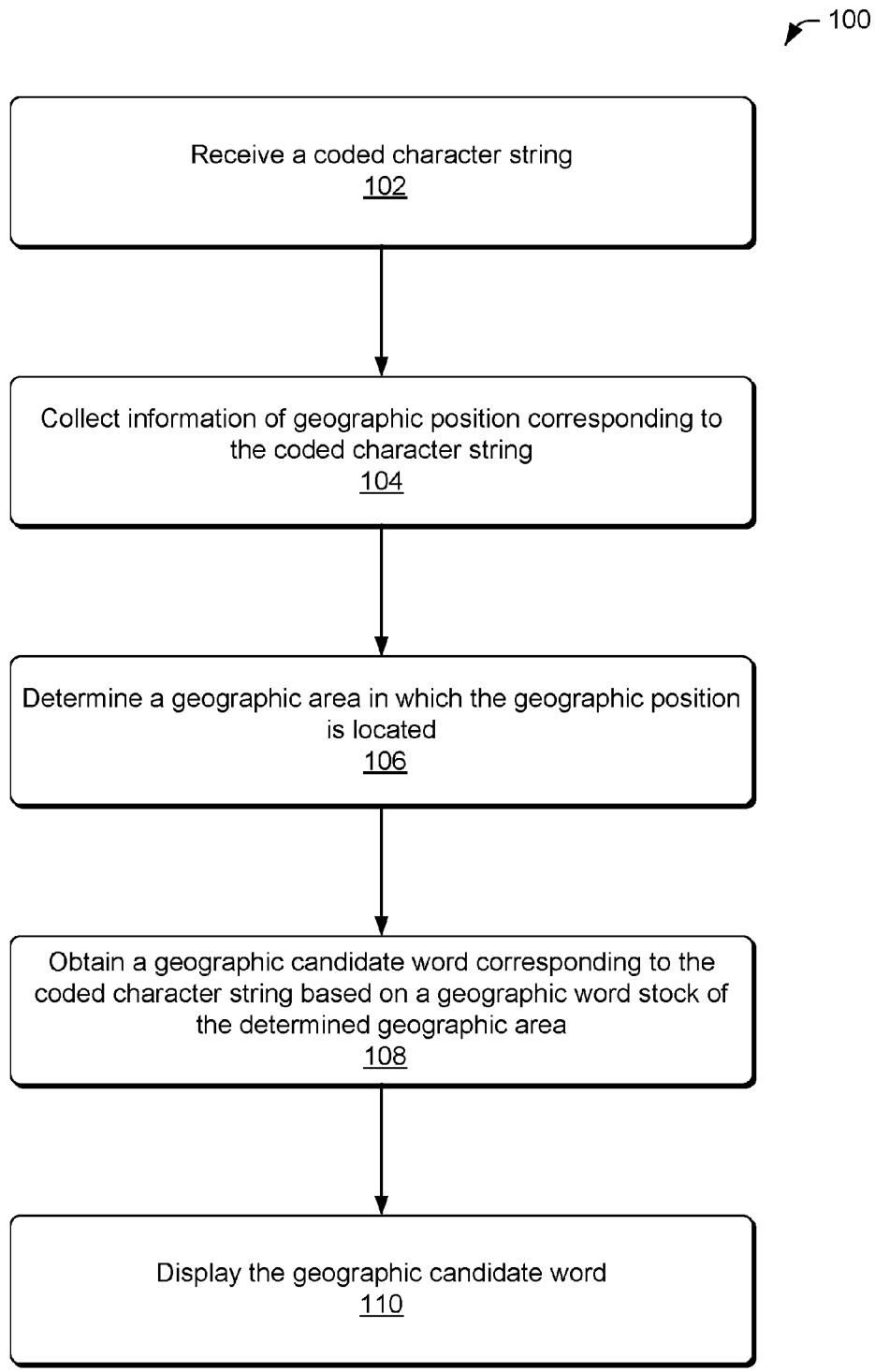
FIG. 1 shows a flowchart for recommending a candidate word according to a geographic position.

FIG. 1 shows a flowchart for recommending a candidate word according to a geographic position. The flowchart 100 and other flowcharts (i.e., 200 and 300) described throughout this disclosure, are illustrated as collections of blocks in logical flow graphs, which represent sequences of operations that can be implemented in a combination of hardware (e.g., a computing device) and software.

At 102, a computing device (e.g., a user device or a server) may receive a coded character string from a user. At 104, the computing device may collect geographic position information corresponding to the coded character string. At 106, the computing device may determine a geographic area in which the geographic position information is located.

At 108, the computing device may retrieve and/or obtain a geographic candidate word corresponding to the coded character string according to a geographic word stock of the determined geographic area. In these instances, the geographic word stock of the geographic area is used for storing the coded character string and a corresponding geographic word according to the geographic area. At 110, the computing device may display the geographic candidate word.

The disclosure can be applied to various scenes of input contents associated with the geographic positions according to requirements of users. For example, a user needs to tell friends about a name of a market when shopping in the market of Dongcheng District of Beijing. The user may input (e.g., type) a coded character string of 'dfxtd' in a short message service (SMS) window so that a geographic word of Dongfangxintiandi in the geographic area in which the user is located is automatically recommended according to the user's geographic position information.

For another example, the user sees a restaurant of Zhangshengji and wants to search for reviews of the restaurant when shopping in a mall in No. 701 Fuchun Road Jianggan District of Hangzhou. The user may type 'zsj' in "dianping.com", and then a geographic word of the Zhangshengji in the geographic area in which the user is located may be automatically recommended according to the user's geographic position information.

For yet another example, the user needs to search locations of some scenic spots when touring in Lijiang to search 'lshh' in a map. As a result, a geographic word of 'Lashihai' in the geographic area in which the user is located is automatically recommended according to the user's geographic position information.

In general, a desired input method not only understands users' input content but also grasps their intent, and then provides various options based on the input content and intent. However, using current technologies, the candidate word is limited in two aspects, namely a geographic name and a dialect. Therefore, influence of a geographic position in which the user is located on the input requirements of the user may not be considered. In addition, the input requirements of the user cannot be intelligently known, and thus a candidate word desired by the user may not be displayed.

To intelligently know input requirements of a user, embodiments of this disclosure recommend a geographic candidate word to the user according to comprehensive influence of an inputted coded character string and the geographic position information corresponding to the coded character string. The geographic candidate word matches with the coded character string and the geographic position information. Furthermore, the geographic candidate word is obtained by retrieving in a geographic word stock of a geographic area in which the geographic position information is located. The geographic word stock of the geographic area may store the coded character string and the corresponding geographic word. Therefore, in the disclosure, the geographic candidate word of the geographic area in which the user is located according to the geographic position information can be recommended. The candidate word desired by the user can be displayed in the input process, and the intelligence of the input method can be improved.

The geographic position information corresponding to a coded character string may be geographic position information of a user when the user inputs the coded character string. In some embodiments, the corresponding geographic position information can be collected according to the Internet Protocol (IP) address, the mobile device Global Positioning System (GPS) or the mobile network of a user based on a coded character string of the user. The disclosure does not limit a method for collecting the geographic position information corresponding to the coded character string.

The disclosure provides a method for determining the geographic area in which the geographic position is located. In some embodiments, a geographic position information range (e.g., a longitude and latitude range) of the geographic area can be pre-stored. The geographic position information is matched with the pre-stored geographic position range of the geographic area. For example, if the longitude of the existing geographic position information is larger than an initial value of the GPS longitude of the pre-stored geographic area, and the longitude of the existing geographic position information is smaller than an end value of the GPS longitude of the pre-stored geographic area, and the latitude of the existing geographic position information is larger than an initial value of the GPS latitude of the pre-stored geographic area, and the latitude of the existing geographic position information is smaller than an end value of the GPS latitude of the pre-stored geographic area, then, the geographic area of the existing geographic position information can be determined to be successfully matched with the pre-stored geographic area.

In some embodiments, the geographic area can be queried in various geographic service websites according to the geographic information. In sum, the disclosure does not limit the method for determining the geographic area in which the geographic position is located. Those skilled in the art can regulate the fine granularity of a geographic area according to actual requirements. For example, the fine granularity of the geographic area can include a province, city, district, street, community and the like for a city; and the fine granularity of the geographic area can include a province, city, county, town, village and the like for a country.

In some embodiments, the geographic word stock of the geographic area may store a coded character string and a corresponding geographic word according to a geographic area. Therefore, the mapping relationship of the coded character string and the geographic word can be established and be saved in a corresponding geographic word stock.

Table 1 shows an example of the disclosure of a storage structure of the geographic word stock of the geographic area, and describes the geographic word stock of the urban area of Hangzhou. The corresponding storage structure specifically can include the coded character string and the geographic word.

TABLE 1

| Coded character strings | Geographic words |
| --- | --- |
| lft | Leifengta |
| zsj | Zhangshengji |
| tb | Taobao |

TABLE 1-continued

| Coded character strings | Geographic words |
| --- | --- |
| wxj | Wangxingji |
| zxq | Zhangxiaoquan |

In some embodiments, if the coded character string inputted by the user is 'zsj' and the user is determined to be located in the urban area of Hangzhou according to the geographic position information in which the user is located, the candidate word of 'Zhangshengji' corresponding to the coded character string can be obtained by retrieving in the geographic word stock of the urban area of Hangzhou. Under current technologies, the user will obtain the candidate word of 'Zhangshengji' by inputting the whole spelling of 'zhangshengji'. However, this disclosure can effectively reduce the complexity of an input of a user, as compared with the current technologies.

In some embodiments, the geographic word stock of the geographic area can be constructed various ways. For example, a computing device may count a utilization frequency of a geographic word in a geographic area, and collect the geographic word of which the counting result meets the preset utilization frequency conditions. The computing device may then store the collected geographic word and the corresponding coded character string in the geographic word stock of the geographic area.

Generally, the higher a utilization frequency of a geographic word in a geographic area is, the higher an association degree of a personal or object name corresponding to the geographic word and the geographic area is. Thus, the personal or object name corresponding to the geographic word is widely utilized. In some instances, the personal or object name becomes one of the signs of the geographic area under some conditions. For example, the association degrees of the 'Dongfangxintiandi' and the 'Dongcheng District of Beijing', the 'Zhangshengji' and the 'Hangzhou', and the 'Lashihai' and the 'Lijiang' in the application scenes are high. For another example, the association degree of the 'Jinguigui Street' and the 'Gui Street of Beijing' is high, and the like.

In some embodiments, when a utilization frequency is matched with a corresponding preset utilization frequency condition, the corresponding geographic word may be collected and saved in a geographic word stock of a corresponding geographic area. The corresponding preset utilization frequency condition includes a condition matching with a counted object (the geographic word in the geographic area in this disclosure), a specifically utilized counting method, and/or a counting environment, and the like. Generally, a ratio of utilization times of a counted object to the utilization times of all counted objects in a counting environment is taken as a corresponding utilization frequency.

In some embodiments, a computing device may obtain a geographic word in a geographic area by searching the geographic word of the geographic area from Internet information according to geographic position category (i.e., Solution A1). In some embodiments, the computing device may obtain a geographic word in a geographic area by recording a displayed trigging condition word when a user inputs the triggering condition word and displays on a screen (i.e., Solution A2). In these instances, the triggering condition word is a preset geographic word of the geographic area according to the geographic position category.

In some embodiments, geographic position categories may be configured. For example, the geographic position categories can include one or more of the following categories: business areas, restaurants, clubs, hotels, supermarkets, theatres, scenic spots, schools, banks and gymnasiums.

If the geographic word and corresponding geographic position information are in a restaurant category in Zhongguancun District, restaurants in Zhongguancun District can be searched on the website, such as "dianping.com" and/or "meishi.qq.com." If the geographic word is in a business area category in the Dongcheng District of Beijing, business areas in Dongcheng District of Beijing can be searched on a website associated with the business area or map searching service websites.

In some embodiments, some recording triggering conditions can be configured in a client of the input method and are used for recording and triggering. For example, the client is provided with a module for storing triggering condition words and triggering the input method to record a displayed word when the displayed word inputted by the user is matched with the module.

In some embodiments, users can preset geographic words in a geographic area to be as triggering condition words according to the geographic position category. The disclosure does not limit a specific triggering condition word presetting method.

In some embodiments, the geographic word in the geographic area is obtained according to history input words of the users of the input method so that the geographic words stored in the geographic word of the geographic area can be matched with users' habits, and the geographic candidate word recommended to the users can be also matched with the habits of the most of the users in the geographic area. Therefore, intelligence of the input method can be further improved.

For example, A, B, C and D are residents in Mudanyuan district. Each of A, B, and C inputs (e.g., typing) a coded character string of 'jbchw' in the Mudanyuan District to mean 'Jiangbianchengwai'. However, if a word stock of another user D does not store the word of 'Jiangbianchengwai,' the candidate word of 'Jiangbianchengwai' can be also recommended to the D when the D inputs the coded character string of 'jbchw' in the Mudanyuan district according to this disclosure.

In some embodiments, when the Solution A1 and/or the Solution A2 are/is utilized, an counting environment of a utilization frequency can include environments corresponding to one or more of geographic position categories relative to the Solution A1, environments corresponding to one or more of geographic position categories relative to the Solution A2 or environments corresponding to one or more of geographic position categories relative to the Solution A1 and the Solution A2.

For example, in the Solution A2, the geographic word of 'Jiangbianchengwai' in the Mudanyuan District is obtained. Thus, when the utilization frequency of the 'Jiangbianchengwai' is counted, the inputting times of the 'Jiangbianchengwai' of the user of the input method can be taken as the numerator. The times of one or more of corresponding geographic words in the all geographic position categories obtained by the Solution A2 can be also taken as the denominator. In addition, the times of one or more of corresponding geographic words in the all geographic position categories obtained by the Solution A1 and the Solution A2 can be taken as the denominator. This disclosure does not limit specific counting environments of the utilization frequency.

Furthermore, corresponding to the utilized counting manner, the corresponding preset utilization frequency conditions can be used for judging the degree of the utilization frequency. For example, an embodiment of a preset utilization frequency condition is that the utilization frequency is larger than 0.05 and the like.

In some embodiments, a computing device may retrieve a geographic candidate word corresponding to a coded character string according to a determined geographic word stock of a geographic region. The computing device may retrieve the geographic candidate word corresponding to the coded character string from the geographic word stock of the determined geographic area of a client. In these instances, the computing device may transmit the coded character string and the geographic position information to a server terminal which is used for retrieving the geographic candidate word corresponding to the coded character string from the geographic word stock of the determined geographic area.

In some embodiments, the computing device may further analyze an attribute of a geographic position of an unmatched displayed character when the displayed character or phrase inputted by the user is not matched with the geographic word stock of the determined geographic area. Then, the computing device may synchronize the unmatched character serving as a geographic word into the geographic word stock of the corresponding geographic area of each client terminal when the attribute of the geographic position is analyzed to be matched with the preset geographic position attribution conditions.

In some embodiments, a computing device may analyze the attribute of the geographic position of the unmatched character by collecting the corresponding geographic position information of the unmatched character. The computing device may then determine the corresponding geographic position range of the geographic position information, and count the frequency of the unmatched character within the corresponding geographic position range. If the counted frequency is matched with the preset geographic position attribute conditions (for example, the frequency is larger than a threshold of 0.2), the computing device may determine that the unmatched character is a geographic word, and synchronize the geographic word to the geographic word stock of the corresponding geographic area of each client terminal.

In some embodiments, the client or the server terminal can be used for carrying out an operation of analyzing an attribute of a geographic position of an unmatched character. For example, when the client terminal determines that the displayed character of the user is not matched with the geographic word stock of the determined geographic area, the client terminal can select to carry out the operation of analyzing the attribute of the geographic position of the unmatched character. The client terminal may transmit the unmatched character as a geographic word into the server terminal when the analyzed attribute of the geographic position is matched with a preset geographic position attribute condition. Then, the server terminal carries out a corresponding synchronization operation.

In some embodiments, when the client terminal determines that the displayed character of the user is not matched with a geographic word stock of a determined geographic area, the client terminal can select to transmit the unmatched character into the server terminal. Then, the server terminal carries out corresponding analysis and synchronization operations. In sum, the disclosure aims to enable all clients to use the newest geographic word stock of the geographic area so that the geographic word stock of the geographic area can catch up changes of personal or object names of a certain geographic area. For example, when a new restaurant of 'Waipojia' is opened in the certain geographic area, users in the geographic area can enjoy a corresponding geographic word recommending service of this restaurant and can immediately enjoy the intelligence of the input method.

In some embodiments, a geographic word stock of a geographic area can be further used for storing a coded character string, the corresponding geographic position information of the geographic area, and the corresponding geographic word. A computing device may retrieve a geographic candidate word corresponding to the coded character string and the geographic position information according to the geographic word stock of the determined geographic area.

Table 2 shows an embodiment of the disclosure of a storage structure of the geographic word stock of the geographic area and describes the geographic word stock of the urban area of Hangzhou. In some embodiments, the corresponding storage structure can include the coded character string, the geographic word, a GPS longitude start field, a GPS longitude end field, a GPS latitude start field, a GPS latitude end field and/or the like. In these instances, a GPS longitude and latitude range formed by the GPS longitude start field, the GPS longitude end field, the GPS latitude start field and the GPS latitude end field are used for showing the geographic position information.

The current geographic position information (e.g., east longitude of 120.194245, northern latitude of 30.26383) can be judged to be within the longitude and latitude range of the geographic word of 'Zhangshengji': east longitude of 120.19423<east longitude of 120.19424<east longitude of 120.19535, and northern latitude of 30.26323<northern latitude of 30.26383<northern latitude of 30.26423.

The coded character string of 'zsj' is also matched with the coded character string of the geographic word stock, and thus the geographic word of 'Zhangshengji' is matched. Therefore, under the current technologies, the user can obtain the candidate word of 'Zhangshengji' only if inputting the whole spelling of 'Zhangshengji.' However, embodiments of this disclosure have advantages of capability of effectively reducing the complexity of an input of a user, as compared to the current technologies.

In some embodiments, a geographic word stock of a geographic area can be constructed by counting a utilization frequency of the geographic word in the geographic area and collecting the geographic word of which the utilization frequency meets a corresponding preset utilization frequency condition according to a counting result. In addition, the collected geographic word, the corresponding geographic position information and the corresponding coded character string in the geographic word stock of the geographic area may be stored.

In some embodiments, a computing device may obtain the geographic word in the geographic area and the correspond-

TABLE 2

| Coded character string | Geographic word | GPS longitude start field | GPS longitude end field | GPS latitude start field | GPS latitude end field |
|---|---|---|---|---|---|
| lft | Leifengta | east longitude of 120.193235 | east longitude of 120.19435 | northern latitude of 30.26123 | northern latitude of 30.26234 |
| zsj | Zhangshengji | east longitude of 120.194235 | east longitude of 120.19535 | northern latitude of 30.26323 | northern latitude of 30.26434 |
| tb | Taobao | east longitude of 120.196235 | east longitude of 120.19735 | northern latitude of 30.26623 | northern latitude of 30.26734 |

In one embodiment of the disclosure, if the coded character string inputted by the user is 'zsj', the corresponding geographic position information of the coded character string is 'east longitude of 120.19424 and northern latitude of 30.26383.' Therefore, the geographic position information is determined to belong to the urban area of Hangzhou. To obtain a geographic candidate word corresponding to the coded character string and the geographic position information, a computing device may respectively match the coded character string of 'zsj' and the geographic position information of 'east longitude of 120.19424, northern latitude of 30.26383' with corresponding fields of the geographic word stock.

For example, the geographic position information matching conditions can include: the current geographic position information longitude that is larger than an initial value of the GPS longitude in the geographic word stock; the current geographic position information longitude is smaller than an end value of the GPS longitude in the geographic word stock; the current geographic position information latitude is larger than an initial value of the GPS latitude in the geographic word stock; and the current geographic position information latitude is smaller than an end value of the GPS latitude in the geographic word stock.

ing geographic position information via various solutions. For example, the computing device may collect the geographic word of the geographic area and the corresponding geographic position information from Internet information according to a geographic position category (i.e., Solution B1). The computing device may collect the geographic position information of a triggering condition word when the user inputs the triggering condition word and displays the triggering condition word, and record the displayed triggering condition word, wherein the triggering condition word is a preset geographic word of the geographic area according to the geographic position category (i.e., Solution B2).

Embodiments of this disclosure include two geographic word stocks of the geographic area: 1) for storing the coded character string and the corresponding geographic word according to the geographic area, and 2) for storing the coded character string, the corresponding geographic position information of the geographic area and the corresponding geographic word. Regarding these geographic word stocks, the coded character string is taken as an index in the first geographic word stock, and the coded character string and the geographic position information are taken as the index in the second geographic word stock.

In addition, those skilled in the art can respectively configure the fine granularity of the corresponding geographic area according to any one of the two geographic word stocks of the geographic areas, and the disclosure does not limit the specific use manners.

Figure 2:
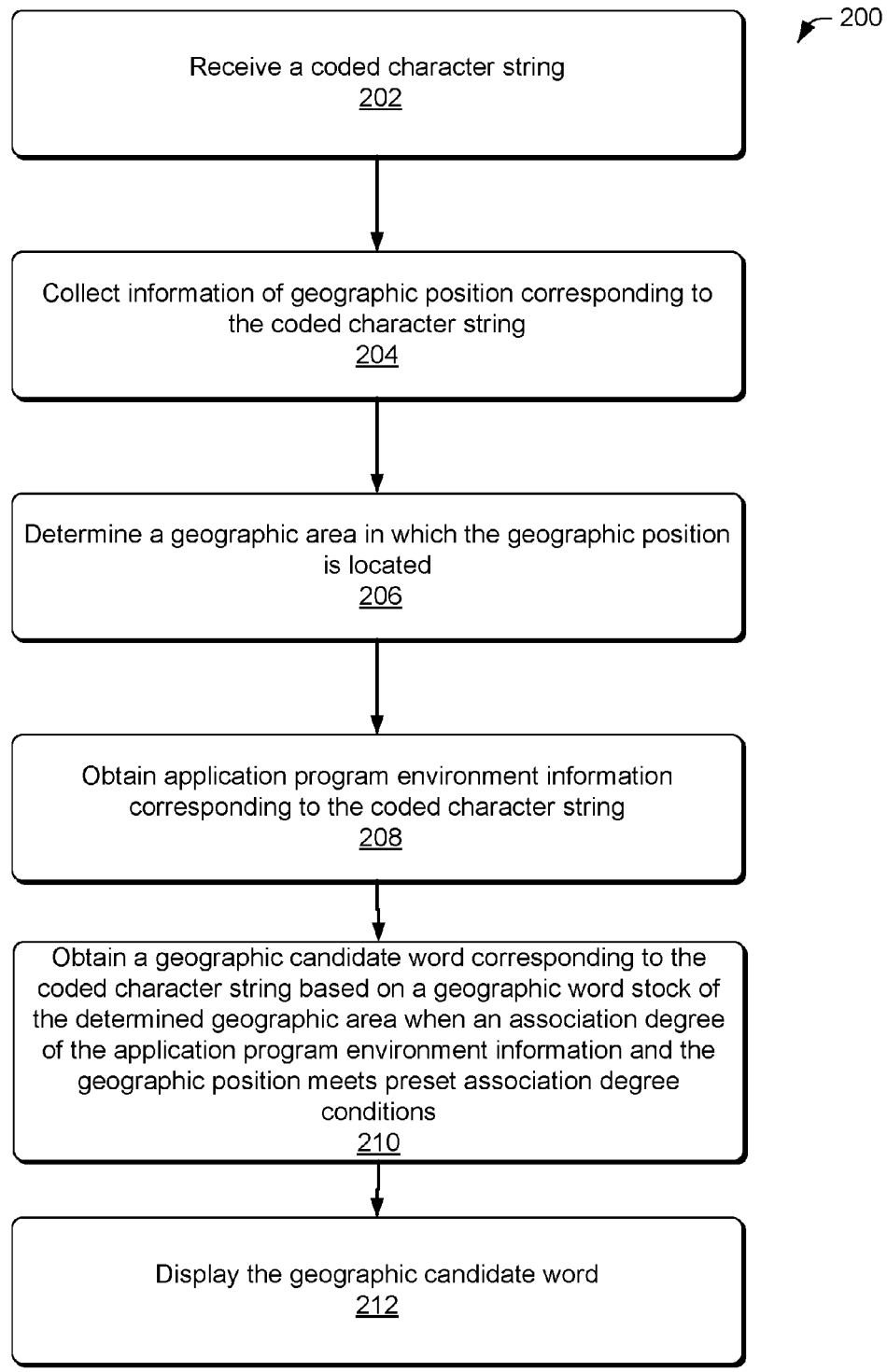
FIG. 2 shows another flowchart for recommending a candidate word according to a geographic position.

FIG. 2 shows a flowchart for recommending a candidate word according to a geographic position. At 202, a computing device may receive a coded character string of a user. At 204, the computing device may collect geographic position information corresponding to the coded character string. At 206, the computing device may determine a geographic area in which the geographic position information is located. At 208, the computing device may obtain application program environment information corresponding to the coded character string.

At 210, the computing device may retrieve a geographic candidate word corresponding to the coded character string according to a geographic word stock of the determined geographic area when the association degree of the application program environment information and the geographic position meets preset association degree conditions. In some instances, the geographic word stock of the geographic area is used for storing the coded character string and the corresponding geographic word according to the geographic area. At 212, the computing device may display the geographic candidate word.

In some embodiments, the geographic candidate word of the geographic area in which the user is located is recommended to the user under a suitable occasion. In these instances, when an association degree of the application program environment information and the geographic position is matched with the preset association degree conditions, the computing device may activate a function of the input method for recommending the geographic candidate word of the geographic area in which the user is located to the user. However, when the association degree of the application program environment information and the geographic position is not matched with the preset association degree conditions, the recommending function is not activated.

Host programs and boarding programs are concepts in the technical field and are described in principle. A host program can be configured to provide software environment (namely host environment), in which the boarding program needs to survive, under the computer environment. And, the host environment can further dynamically download a Dynamic Link Library (DLL) provided by the boarding program so as to dynamically load external functions. In some embodiments, the DLL provided by the boarding program can include an input method editor linkage library (e.g., SogouPy.ime stored under c:\windows\system32) and the like provided by an input method.

In an operating system, such as Windows, UNIX and Linux, as the host program, each application program can select whether the input method is opened or not, and a program handle is transferred to the input method when the input method is opened. For the input method, the application program environment information of the current application program can be obtained according to the program handle. For example, the input method may invoke GetModuleFilename to find out a program path name of 'C:\ProgramFiles\MicrosoftOffice\OFFICE11\WINWORD.EXE' during an operation so as to determine that the corresponding application program environment information is 'WinWord.exe', that is the current coded string is inputted in MICROSOFT WORD®.

In some embodiments, users can collect some application programs that need to use the input method and can pre-configure an association degree of the application program and the geographic position. Therefore, the association degree of the application program and the geographic position are mainly applied to showing a probability of the association of character input in the application program and the geographic position. If the association degree of the application program and the geographic position is lower, the association degree of the character input in the application program and the geographic position is judged to be lower so that the probability of the user in input requirements of the geographic word is judged to be lower. Therefore, the significance of recommendation of the geographic word of the geographic area in which the user is located to the user is low. Otherwise, if the association degree of the application program and the geographic position is higher, the probability of the association of the character input in the application program and the geographic position is higher so that the probability of the user in the input requirements of the geographic word is larger. Therefore, the candidate word required by the user can be recommended to the user in the input process from the geographic words of the geographic area in which the user is located, and the intelligence of the input method can be improved.

An association degree of the application program and the geographic position may be pre-configured. In some embodiments, an application program using the input method can be classified. For example, categories of the application program using the input method can include a map application, periphery search, mobile phone browser, general search, micro-blog, shopping type, instant communication window, game, operating system tool and the like.

Table 3 shows an embodiment of the disclosure of the association degree of the category of the application program using the input method and the corresponding geographic position.

TABLE 3

| Association degree of the category of the application program needing to use the input method and the geographic position | Category of the aplication program needing to use the input method |
|---|---|
| high | map application, periphery search |
| intermediate | mobile phone browser, general search, micro-blog, shopping type, instant communication window |
| low | game, operating system tool |

In some embodiments, an association degree of the application program and the geographic position can be judged by utilizing a preset association degree condition. The preset association degree condition can utilize a quantum condition and can also utilize a grade condition. For example, the association degree of the application program and the geographic position is larger than 0.3, and the grade condition is that the association degree of the application program and the geographic position is intermediate or high.

In some embodiments, a computing device may activate a function for recommending to a user the geographic candidate word in the geographic area in which the user is located only when the association degree of the application program environment information and the geographic position is matched with a preset association degree condition.

This disclosure is additionally provided with a function of judging the user input requirements. Therefore, the computing device can recommend to the user the geographic candidate word of the geographic area in which the user is located according to the geographic position information, and can display the geographic candidate word required by the user in the input process, thereby improving the intelligence of the input method.

Figure 3:
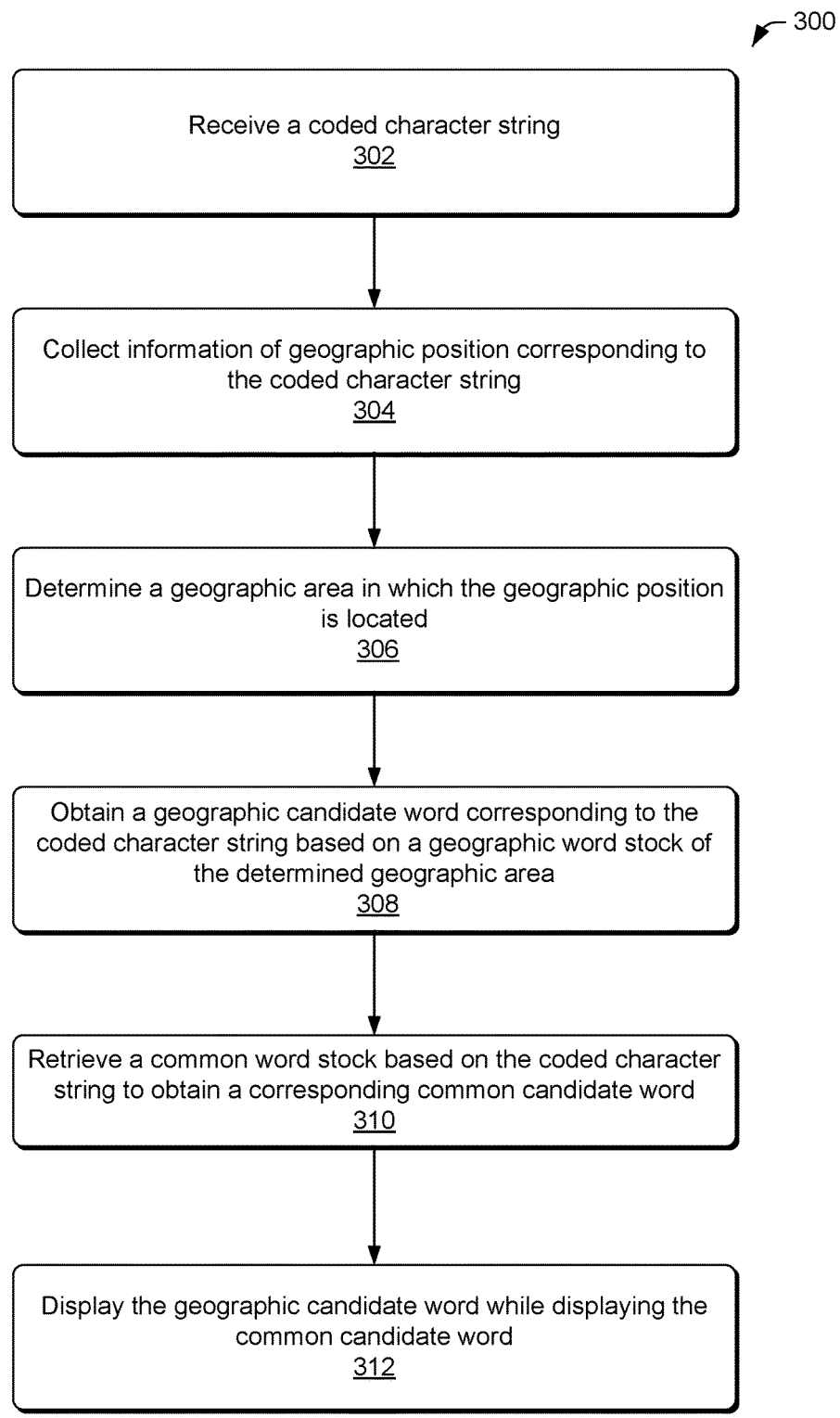
FIG. 3 shows yet another flowchart for recommending a candidate word according to a geographic position.

FIG. 3 shows a flowchart for recommending a candidate word according to a geographic position. At 302, a computing device may receive a coded character string of a user. At 304, the computing device may collect geographic position information corresponding to the coded character string. At 306, the computing device may determine a geographic area in which the geographic position information is located.

At 308, the computing device may retrieve a geographic candidate word corresponding to the coded character string according to a geographic word stock of the determined geographic area, wherein the geographic word stock of the geographic area is used for storing the coded character string and the corresponding geographic word according to the geographic area. At 310, the computing device may retrieve in a common word stock according to the coded character string to obtain a corresponding common candidate word. At 312, the computing device may display the geographic candidate word while displaying the common candidate word. Accordingly, the computing device may display the geographic candidate word when displaying the common candidate word.

In some embodiments, to display geographic candidate word, the computing device may sort a common candidate word and a geographic candidate word according to a sorting factor of a candidate word. The sorting factor may include at least one of a matching degree of the candidate word and the geographic position information, a utilization frequency of the candidate word, and a retrieval sorting policy. The computing device may display the common candidate word and the geographic candidate word according to a sorting result.

In some embodiments, a candidate word may be obtained according to a geographic word stock or a common word stock. Based on the candidate word which is obtained according to the geographic word stock, a matching degree of the candidate word and the geographic position information is the matching degree of the geographic position information stored in the geographic word stock and the geographic position information (e.g., the matching degree is 80-100%). Based on the common candidate word which is obtained according to the common word stock, the matching degree of the candidate word and the geographic position information is 0.

If the input method is used online or in a manner of communicating with a server, the client or the server terminal can input the candidate words into a search engine to search and can sort the candidate words with many searching results in the front. This kind of sorting policy of candidate words uses searching method.

In some embodiments, the sorting factor can further include an association degree of the application program environment information and the geographic position under the condition that the application program environment information corresponding to the coded character string, and an association degree of the application program environment information and the geographic position.

It is important to note that a certain weight can be respectively applied to each sorting factor when various sorting factors are utilized, and candidate words are sorted according to weighting results of the various sorting factors.

In some embodiments, a computing device may recommend a candidate word according to the geographic position. The computing device may receive the coded character string of the user, and then collect the geographic position information corresponding to the coded character string.

As intelligent mobile phones and tablet personal computers have become popular, the operating system of a mobile device is usually provided with a function of obtaining an Application Programming Interface (API) of a located geographic position. The geographic position obtaining function provided by conventional operating systems can be directly utilized in this disclosure.

For example, the operating system of a computing device can judge whether a GPS module exists and/or opens. The operating system can directly open a function of an input method for recommending to a user a geographic candidate word in a geographic area in which the user is located. The operating system can continuously obtain the current geographic position information if the GPS module opens regularly. The operating system can return common functions of the input method if the GPS module opens irregularly.

In some embodiments, a computing device may obtain the current geographic position information. The computing device can open a position management service of the operating system, initialize the position management service to obtain the GPS position information, and continuously update the current most precise GPS position information by monitoring at time space (such as 10 seconds). In these instances, the computing device may determine the geographic area in which the geographic position information is located, and obtain the application program environment information corresponding to the coded character string. The computing device may also determine whether an association degree of the application program environment information and the geographic position is matched with the preset association degree condition or not. If yes, the computing device may retrieve the geographic candidate word corresponding to the coded character string and the geographic position information according to the geographic word stock of the determined geographic area, and then display the geographic candidate word.

If the association degree of the application program environment information and the geographic position is not matched with the preset association degree condition, the computing device may retrieve in the common word stock the corresponding common candidate word according to the coded character string, and then display the common candidate word.

Figure 4:
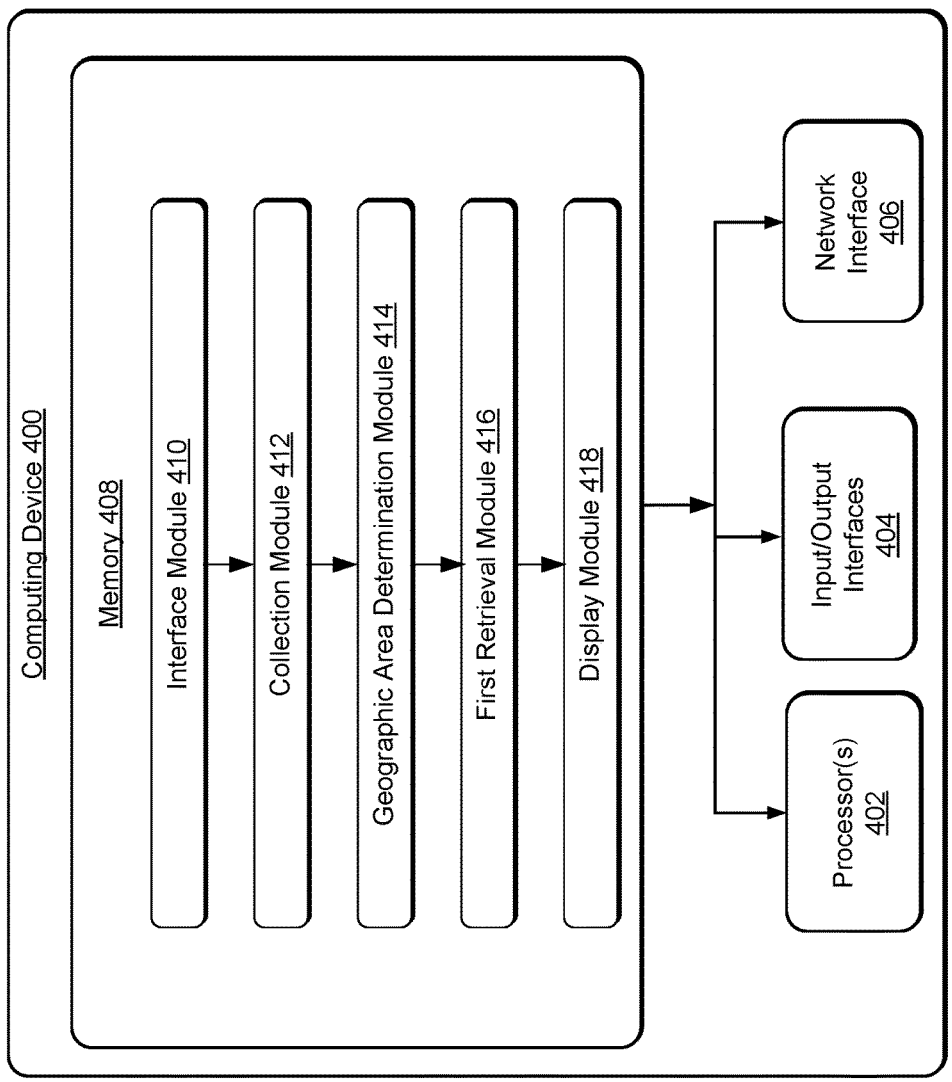
FIG. 4 shows a structural diagram of a device for recommending a candidate word according to a geographic position.

FIG. 4 shows a structural diagram of a device for recommending a candidate word according to a geographic position. FIG. 4 illustrates an example of a computing device 400. The computing device 400 may be a user device or a server. In one exemplary configuration, the computing device 400 includes one or more processors 402, input/output interfaces 404, network interface 406, and memory 408.

The memory 408 may include computer-readable media in the form of volatile memory, such as random-access memory (RAM) and/or non-volatile memory, such as read only memory (ROM) or flash RAM. The memory 308 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 408 in more detail, the memory 408 may include an interface module 410 for receiving a coded character string of a user, a collection module 412 for collecting geographic position information corresponding to the coded character string, and a geographic area determination module 414 for determining a geographic area in which the geographic position information is located.

The memory 408 may also include a first retrieval module 416, which is configured to retrieve and/or obtain a geographic candidate word corresponding to the coded character string according to a geographic word stock of the determined geographic area, wherein the geographic word stock of the geographic area is used for storing the coded character string and the corresponding geographic word according to the geographic area. The memory 408 may also include a display module 418, which is configured to display the geographic candidate word.

In some embodiments, the memory 408 may also include a geographic word stock construction module used for constructing the geographic word stock of the geographic area. The geographic word stock construction module may include a counting sub-module for counting the utilization frequency of a geographic word in the geographic area, a collection sub-module for collecting the geographic word of which the utilization frequency meets a corresponding preset utilization frequency condition according to a counting result, and a storage sub-module for storing the collected geographic word and the corresponding coded character string in the geographic word stock of the geographic area.

In some embodiments, the memory 408 may also include a first obtaining module for obtaining the geographic word in the geographic area. The first obtaining module may include an Internet collection sub-module for collecting the geographic word of the geographic area from Internet information according to a geographic position category, and/or a triggering and obtaining sub-module for recording a triggering condition word displayed on a screen when the user inputs the triggering condition word and displays on the screen. In these instances, the triggering condition word is a preset geographic word of the geographic area according to the geographic position category.

In some embodiments, the geographic word stock of the geographic area further stores the coded character string, the corresponding geographic position information of the geographic area and the corresponding geographic word. In some embodiments, the memory 408 may also include a second retrieval module retrieving and/or obtaining a geographic candidate word corresponding to the coded character string and the geographic position information according to the geographic word stock of the determined geographic area.

In some embodiments, the memory 408 may also include an application program environment obtaining module for obtaining application program environment information corresponding to the coded character string. The first retrieval module 416 can obtain the geographic candidate word corresponding to the coded character string and the geographic position information according to the geographic word stock of the determined geographic area when the association degree of the application program environment information and the geographic position meets the preset association degree conditions.

In some embodiments, the memory 408 may also include a third retrieval module for retrieving in a common word stock according to the coded character string to obtain a corresponding common candidate word. The display module 418 can display the geographic candidate word while displaying the common candidate word.

In some embodiments, the display module 418 can further include a sorting sub-module for sorting the common candidate word and the geographic candidate word according to the sorting factor of a candidate word. The sorting factor comprises one or more of the following factors: the matching degree of the candidate word and the geographic position information, the utilization frequency of the candidate word and a retrieval sorting policy, and a sorting display sub-module used for displaying the common candidate word and the geographic candidate word according to a sorting result.

In some embodiments, the sorting factor can further include the association degree of the application program environment information and the geographic position.

In some embodiments, the first retrieval module can further include a client retrieval sub-module used for retrieving the geographic candidate word corresponding to the coded character string and the geographic position information from the geographic word stock of the determined geographic area of a client; and/or a server terminal retrieval sub-module used for transmitting the coded character string and the geographic position information to a server terminal which is used for retrieving the geographic candidate word corresponding to the coded character string and the geographic position information from the geographic word stock of the determined geographic area.

In some embodiments, the memory 408 may also include an analysis module for analyzing the attribute of a geographic position of an unmatched displayed character when the displayed character inputted by the user is not matched with the geographic word stock of the determined geographic area. In addition, the memory 408 may include a synchronization module used for synchronizing the unmatched character served as a geographic word into the geographic word stock of the corresponding geographic area of each client when the analyzed attribute of the geographic position is matched with a preset geographic position attribute condition.

In some embodiments, the collection module 412 can collect the geographic position information corresponding to the coded character string according to user IP address, mobile device GPS or mobile network.

Those skilled in the art should know: embodiments of the disclosure can be disclosed to be a method, a system or a computer program product. Therefore, the embodiments can utilize a manner of a complete hardware embodiment, a complete software embodiment or an embodiment of combining the software and the hardware. In addition, the embodiments can utilize a manner of a computer program product implemented in one or more computer available storage mediums (including but not limiting to a disc memory, a CD-ROM, an optical memory and the like) including computer available program codes.

The disclosure is described according to the flowchart and/or the block diagram of a method, a device (a system) and a computer program product, which means that computer program commands can realize each flow and/or block in the flowchart and/or the block diagram, and the combination of the flows and/or the blocks of the flowchart and/or the block diagram. The computer program commands can be provided for processors of general-purpose computers, special computers, embedded processors or other programmable data processing devices so as to generate a machine, and a device for realizing appointed functions in one or more flows of the flowchart and/or one or more blocks of the block diagrams is generated according to the command performed by the processors of the computers or other programmable data processors.

The computer program commands can be also stored in computer readable memories capable of guiding the computers or the other programmable data processing devices to operate in specific manners so that the commands stored in the computer readable memory generate products including command devices, wherein the command device realizes an appointed function in one or more flows of the flowchart and/or one or more blocks of the block diagram.

The computer program commands can be loaded in the computers or other programmable data processing devices so that a series of operating steps are carried out in the computers or the other programmable devices to generate the process realized by the computers; therefore, the commands performed by the computers or the other programmable devices provide a step for realizing the appointed function in one or more flows of the flowchart and/or one or more blocks of the block diagram.

Even though the certain embodiments of the disclosure are described, those skilled in the art can do other changes and modifications to the embodiments once when knowing the basic creative concept; therefore, the attached claims mean to explain the preferable embodiments and all changes and modifications within the range of the disclosure.

Each embodiment of this disclosure is described in a stepping manner, the important description part of each embodiment is different from each other, and the same and similar parts of each embodiment are mutually referred.

The method and device for recommending the candidate word according to the geographic position, provided by the disclosure, are introduced in detail, the disclosure describes the principle and the implementation manners by utilizing specific embodiments, and the description of the embodiments only is used for helping understand the method provided by the disclosure and the core concepts of the disclosure; and meanwhile, for those skilled in the art, the specific implementation manners and the application range could partially change according to the concept of the disclosure. In sum, the content of the specification of the disclosure is not the limitation in the disclosure.

What is claimed is:

1. A computer-implemented method for word recommendation, comprising:
   constructing a geographic-related language database of a geographic-related language by counting utilization frequencies of words in the geographic-related language, and collecting one or more geographic-related language words having a utilization frequency greater than a predetermined value;
   receiving, from a user device, a coded character string;
   collecting geographic information associated with the user device;
   determining a geographic-related language corresponding to the geographic information; and
   obtaining a geographic-related language candidate word corresponding to the coded character string based on the geographic-related language database of the geographic-related language.

2. The computer-implemented method of claim 1, further comprising presenting the geographic-related language candidate word.

3. The computer-implemented method of claim 1, further comprising:
   storing the one or more geographic-related language words and one or more coded character strings corresponding to the one or more geographic-related language words.

4. The computer-implemented method of claim 1, wherein the geographic-related language database of the geographic-related language is obtained by at least one of:
   collecting the geographic-related language words in the geographic-related language based on a geographic position category; or
   recording a displayed triggering condition word that is a preset geographic-related language word in the geographic-related language based on the geographic position category.

5. The computer-implemented method of claim 1, further comprising:
   obtaining application program environment information associated with the user device, wherein the obtaining the geographic-related language candidate word comprises obtaining the geographic-related language candidate word when an association degree of the application program environment information and the geographic information associated with the user device satisfies a preset association degree condition.

6. The computer-implemented method of claim 1, further comprising:
   retrieving a corresponding common candidate word in a common database based on the coded character string; and
   presenting the geographic-related language candidate word when displaying the common candidate word.

7. The computer-implemented method of claim 6, further comprising sorting the common candidate word and the geographic-related language candidate word based on a sorting factor of a candidate word.

8. The computer-implemented method of claim 7, wherein the sorting factor includes at least one of a matching degree of the candidate word and the geographic information, a utilization frequency of the candidate word, or a retrieval sorting policy.

9. The computer-implemented method of claim 7, wherein the sorting factor further includes an association degree of application program environment information and a geographic position.

10. The computer-implemented method of claim 1, further comprising:
    analyzing an attribute of a geographic position of an unmatched displayed character when a displayed character is not matched with the geographic-related language database of the geographic-related language; and
    synchronizing the unmatched character served as a geographic-related language word into the geographic-related language database of the geographic-related language when the analyzed attribute of the geographic position is matched with a preset geographic position attribute condition.

11. A computing device comprising:
one or more processors; and
memory to maintain a plurality of components executable by the one or more processors, the plurality of components comprising:
an interface module configured to receive a coded character string;
a collection module configured to collect geographic position information corresponding to the coded character string;
a geographic-related language determination module configured to determine a geographic-related language in which the geographic position information is located;
a geographic-related language database construction module configured to construct a geographic-related language database of the geographic-related language, and the geographic-related language database construction module further comprises:
a counting sub-module configured to count a utilization frequency of a word in the geographic-related language; and
a collection sub-module configured to collect words in the geographic-related language of which the utilization frequency satisfies a corresponding preset utilization frequency condition according to a counting result;
a first retrieval module configured to obtain a geographic-related language candidate word corresponding to the coded character string according to the geographic-related language database of the determined geographic-related language, wherein the geographic-related language database of the geographic-related language is used for storing the coded character string and the corresponding geographic-related language candidate word according to the geographic-related language; and
a display module configured to display the geographic-related language candidate word.

12. The computing device of claim 11, wherein the geographic-related language database construction module further comprises:
a storage sub-module used configured to store the collected geographic-related language word and the corresponding coded character string in the geographic-related language database of the geographic-related language.

13. The computing device of claim 12, wherein the plurality of components further comprise a first obtaining module configured to obtain the geographic-related language word in the geographic-related language, wherein the first obtaining module comprises:
an Internet collection sub-module configured to collect the geographic-related language word of the geographic-related language from Internet information according to a geographic position category; and
a triggering and obtaining sub-module configured to record a triggering condition word displayed on a screen when a user inputs the triggering condition word and displays on the screen, wherein the triggering condition word is a preset geographic-related language word of the geographic-related language according to the geographic position category.

14. The computing device of claim 11, wherein the plurality of components further comprise:
an application program environment obtaining module configured to obtain application program environment information corresponding to the coded character string, wherein the first retrieval module is configured to further obtain the geographic-related language candidate word corresponding to the coded character string and the geographic position information according to the geographic-related language database of the determined geographic-related language when an association degree of the application program environment information and a geographic position satisfies a preset association degree condition.

15. One or more computer-readable media storing computer-executable instructions that, when executed by one or more processors, instruct the one or more processors to perform acts comprising:
constructing a geographic-related language word database of a geographic-related language region by counting utilization frequencies of words in the geographic-related language region, and collecting one or more geographic-related language words having a utilization frequency greater than a predetermined value;
receiving a string including one or more characters;
determining a geographic-related language region associated with a user device;
identifying the geographic-related language word database corresponding to the geographic-related language region; and
determining a phrase corresponding to the string using the geographic-related language word database, the phrase including one or more words.

16. The one or more computer-readable media of claim 15, wherein the acts further comprise presenting the phrase.

17. The one or more computer-readable media of claim 15, wherein the acts further comprise obtaining geographic information associated with the user device, and wherein the determining the geographic-related language region associated with the user device comprises determining the geographic-related language region based on the geographic information.

18. The one or more computer-readable media of claim 17, wherein the acts further comprise determining an application operating on the user device, and the determining the phrase further comprises determining the phrase when an association degree of the application and the geographic information satisfies a preset association degree condition.

19. The one or more computer-readable media of claim 17, wherein the acts further comprise:
analyzing the geographic information to determine an additional geographic-related language region associated with the user device; and
determining the phrase using an additional geographic-related language word database corresponding to the additional geographic-related language region.

20. The one or more computer-readable media of claim 19, wherein the acts further comprise updating the geographic-related language word database by adding the phrase.

* * * * *